(12) United States Patent
Vögtle et al.

(10) Patent No.: US 12,344,096 B2
(45) Date of Patent: Jul. 1, 2025

(54) TORQUE TRANSMITTING DEVICE

(71) Applicant: Schaeffler Technologies AG & Co. KG, Herzogenaurach (DE)

(72) Inventors: Benjamin Vögtle, Weingarten (DE); Thorsten Krause, Bühl (DE); Stephan Maienschein, Baden-Baden (DE); Peter Wahl, Wörth-Maximiliansau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 119 days.

(21) Appl. No.: 17/767,685

(22) PCT Filed: Aug. 20, 2020

(86) PCT No.: PCT/DE2020/100728
§ 371 (c)(1),
(2) Date: Apr. 8, 2022

(87) PCT Pub. No.: WO2021/069009
PCT Pub. Date: Apr. 15, 2021

(65) Prior Publication Data
US 2024/0116354 A1   Apr. 11, 2024

(30) Foreign Application Priority Data
Oct. 10, 2019   (DE) ............... 10 2019 127 216.5

(51) Int. Cl.
*B60K 6/40*       (2007.10)
*B60K 6/387*      (2007.10)
(Continued)

(52) U.S. Cl.
CPC ........... *B60K 6/40* (2013.01); *B60K 6/387* (2013.01); *B60K 6/48* (2013.01); *F16D 3/12* (2013.01);
(Continued)

(58) Field of Classification Search
CPC . B60K 6/40; B60K 6/387; B60K 6/48; B60K 2006/4825; F16D 3/12; F16D 2300/22; B60Y 2200/92; F16H 2045/0231
See application file for complete search history.

(56) References Cited

U.S. PATENT DOCUMENTS 8,617,018 B2 * 12/2013 Wahl ................... F16H 1/36
475/8
9,193,255 B2 * 11/2015 Arnold .................. F16D 21/06
(Continued)

FOREIGN PATENT DOCUMENTS

CN       103975145 A      8/2014
CN       104620018 A      5/2015
(Continued)

*Primary Examiner* — Thomas C Diaz (57) ABSTRACT

A torque transmitting device for a drive train for transmitting an input torque provided by at least one drive element to an output element. The device including: an electric motor having a stator and a rotor which can be rotated relative to said stator for providing a further drive torque; a separating clutch arranged operatively between the first drive element and the electric motor; and at least one centrifugal pendulum which is arranged operatively between the separating clutch and the output element and has at least two pendulum masses which are accommodated so as to be deflectable to a limited extent along a pendulum path and so as to be peripherally adjacent to one another on at least one pendulum mass carrier that can be rotated about an axis of rotation, wherein the peripherally adjacent pendulum masses are coupled to one another via coupling means.

9 Claims, 8 Drawing Sheets (51) Int. Cl.
　　*B60K 6/48*　　　(2007.10)
　　*F16D 3/12*　　　(2006.01)
　　*F16H 45/02*　　 (2006.01)
　　*F16H 45/00*　　 (2006.01)

(52) U.S. Cl.
　　CPC ...... *F16H 45/02* (2013.01); *B60K 2006/4825* (2013.01); *B60Y 2200/92* (2013.01); *F16D 2300/22* (2013.01); *F16H 2045/002* (2013.01); *F16H 2045/0231* (2013.01); *F16H 2045/0263* (2013.01)

(56) References Cited

U.S. PATENT DOCUMENTS

| | | | |
|---|---|---|---|
| 2013/0205944 A1 | 8/2013 | Sudau | |
| 2017/0108078 A1* | 4/2017 | Dinger | F16F 15/1414 |
| 2017/0307047 A1* | 10/2017 | Rentfrow | F16F 15/145 |
| 2018/0245665 A1 | 8/2018 | Hennebelle et al. | |

FOREIGN PATENT DOCUMENTS

| | | |
|---|---|---|
| CN | 105074271 A | 11/2015 |
| CN | 106065920 A | 11/2016 |
| CN | 107110235 A | 8/2017 |
| CN | 107250602 A | 10/2017 |
| CN | 107923485 A | 4/2018 |
| DE | 19831156 A1 | 1/2000 |
| DE | 102012219028 A1 | 5/2013 |
| DE | 102013213422 A1 | 2/2014 |
| DE | 102012221103 A1 | 5/2014 |
| DE | 112012006376 T5 | 1/2015 |
| DE | 102014222644 A1 | 5/2016 |
| DE | 102016217218 A1 | 3/2018 |
| EP | 3085990 A1 | 10/2016 |
| WO | 2012083920 A1 | 6/2012 |
| WO | 2017025091 A1 | 2/2017 |
| WO | 2018010722 A1 | 1/2018 |
| WO | 2018041294 A2 | 3/2018 |

* cited by examiner

TORQUE TRANSMITTING DEVICE

CROSS-REFERENCE TO RELATED APPLICATIONS

This application is the U.S. National Phase of PCT Appln. No. PCT/DE2020/100728 filed Aug. 20, 2020, which claims priority to DE 10 2019 127 216.5 filed Oct. 10, 2019, the entire disclosures of which are incorporated by reference herein.

TECHNICAL FIELD

The disclosure relates to a torque transmitting device.

BACKGROUND

A torque transmitting device is known, for example, from DE 10 2014 222 644 A1. A torque transmitting device for a drive train of a motor vehicle is described therein. The torque transmitting device comprises an input side for connection to an internal combustion engine as a drive element, an output side for connection to an output element, an electric motor with a stator and a rotor, and a torsional vibration damper between the rotor and the output side. The torsional vibration damper comprises a centrifugal pendulum to reduce torsional vibrations.

SUMMARY

The object of the present disclosure is to improve a torque transmitting device. The centrifugal pendulum should be made more efficient and reliable. The torsional vibrations and the operating noise of the centrifugal pendulum should be reduced more.

At least one of these objects is achieved by a torque transmitting device with the features according to the disclosure. As a result, the disturbing noises in the drive train can be reduced. For example, with electric driving via the electric motor and the drive element switched off, a quieter operation of the drive train is made possible. When the drive element is in operation, the torsional vibrations are reduced to a greater extent. The noise of the centrifugal pendulum can be reduced.

The drive train may be that of a vehicle. The drive train can be a hybrid drive train. The drive element and the electric motor can be installed in a P2 hybrid arrangement. The separating clutch can be a K0 clutch.

The drive element can be an internal combustion engine. The internal combustion engine can trigger torsional vibrations. The torsional vibrations can have at least one main excitation order, wherein the centrifugal pendulum is designed for this main excitation order in order to reduce the torsional vibrations as much as possible.

The output element can be a transmission. The transmission can be an automatic transmission, a manual transmission, a CVT transmission or a dual clutch transmission.

A centrifugal pendulum can be arranged operatively between the electric motor and the output element. The pendulum mass can be deflected to a limited extent relative to the pendulum mass carrier via bearing elements, for example spherical rollers. The coupling means can be designed separately from the bearing elements. The pendulum mass can be made up of a first pendulum mass part and a second pendulum mass part connected to it. The first pendulum mass part can be arranged on a first axial side of the pendulum mass carrier and the second pendulum mass part can be arranged on an opposite second axial side of the pendulum mass carrier.

A further centrifugal pendulum can be arranged operatively between the separating clutch and the output element. The further centrifugal pendulum can be designed for the same or a different main excitation order than the centrifugal pendulum. The centrifugal pendulum can be designed for a first load condition and the further centrifugal pendulum can be designed for the first load condition or a different load condition. The centrifugal pendulum and/or the further centrifugal pendulum can be operated in a fluid or dry.

The pendulum masses can be arranged on at least two pendulum mass carriers. The pendulum mass carrier can be firmly connected to each other. The pendulum mass carriers can be arranged axially spaced from one another. The pendulum masses can be arranged axially between the two pendulum mass carriers. The pendulum mass carriers can each be designed as a sheet metal component.

In a preferred embodiment of the disclosure, the coupling means are configured to set a force coupling and/or a movement coupling between the pendulum masses, wherein the coupling means for force coupling have spring means and/or the coupling means for movement coupling have transmitting means for transmitting the movement of one of the pendulum masses to at least the other pendulum mass. The coupling means can limit or prevent the pendulum masses from falling, in particular at low speeds, for example during electric driving.

The spring means can have at least one helical spring. The helical spring can be a compression spring or an arc spring. The spring means can have a single-stage or multi-stage spring characteristic curve. The spring means can have a travel limit caused by stop limit means. The stop limit means can have damping means for damping the travel limitation.

The transmitting means can have at least one connecting element. The connecting element can be arranged peripherally between the pendulum masses. Starting from a pendulum mass, the connecting element can run radially inwards and again extend radially outwards to the second pendulum mass. The connecting element can be arranged coaxially to the axis of rotation. The connecting element can be rigid and/or movably connected to the pendulum masses.

In a specific embodiment of the disclosure, the coupling means are arranged on the periphery between the pendulum masses. The coupling means can be connected directly to the pendulum masses. The coupling means can be arranged between a circumferential edge surface of one pendulum mass and the peripherally adjacent edge surface of the other pendulum mass.

In a preferred embodiment of the disclosure, the pendulum mass, when moving along the pendulum track, rotates of its own accord about a center of rotation that deviates from the axis of rotation. As a result, better damping of the torsional vibrations can be achieved.

In a preferred embodiment of the disclosure, a torsional vibration damper having a rotatable damper input part and a damper part which can be rotated to a limited extent relative thereto via the action of spring elements is arranged operatively between the separating clutch and the output element. As a result, the torsional vibrations of the drive element can be reduced even further. The damper part can be a damper output part. The mass moment of inertia of the damper input part is preferably less than the mass moment of inertia of the damper output part.

The spring elements can comprise helical springs. The helical spring can be an arc spring and/or compression spring. The spring elements can have a single-stage or multi-stage spring characteristic curve.

A further torsional vibration damper can be arranged operatively between the output element and the separating clutch. The torsional vibration damper and the further torsional vibration damper can be effective in series when the separating clutch is closed. The further torsional vibration damper can be designed with several stages. Another centrifugal pendulum can be arranged on the other torsional vibration damper. The additional torsional vibration damper can be a dual mass flywheel.

In a specific embodiment of the disclosure, the torsional vibration damper is designed with several stages and the damper part is an intermediate damper part to which a further damper part is connected in a limited rotatable manner via the action of further spring elements which are connected in series with the first spring elements. The second damper part can be a damper output part.

In a preferred embodiment of the disclosure, the centrifugal pendulum is arranged on the damper input part or on the damper part. The centrifugal pendulum can be arranged on the intermediate damper part or on the damper output part.

Another centrifugal pendulum can be arranged on the same component as the centrifugal pendulum or on a different component. For example, the centrifugal pendulum can be arranged on the damper input part, and the further centrifugal pendulum, on the damper output part. The centrifugal pendulums can have a common pendulum mass carrier or a pendulum mass carrier that is designed separately from one another.

In a specific embodiment of the disclosure, a torque transmitting unit is arranged operatively between the separating clutch and the driven element, and the centrifugal pendulum is assigned to the torque transmitting unit. The torque transmitting unit can be a torque converter with a pump impeller and a turbine wheel and in particular with a converter bridging clutch. The torque transmitting unit can be a clutch, for example a double clutch. The clutch can run wet or dry.

In a specific embodiment of the disclosure, the torsional vibration damper is arranged within the torque transmitting unit. The torque transmitting unit can have a housing in which the torsional vibration damper and/or the centrifugal pendulum is arranged. The housing can delimit a fluid space that can be filled with a fluid. The torsional vibration damper can be operated wet. The housing can be a converter housing.

Particularly preferably, the centrifugal pendulum is arranged operatively between the damper output part of the torsional vibration damper and the output element. In particular, the turbine wheel is connected to the damper output part. The torsional vibration damper is particularly preferably designed in one stage.

In a specific embodiment of the disclosure, the pendulum masses are arranged at least partially radially overlapping the rotor. An inner periphery of the pendulum mass may be located radially inward or radially outward of an inner periphery of the rotor. An outer periphery of the pendulum mass may be located radially inward or radially outward of an outer periphery of the rotor.

Further advantages and advantageous embodiments of the disclosure result from the description of the figures and the drawings.

BRIEF DESCRIPTION OF THE DRAWINGS

The disclosure is described in detail below with reference to the drawings. Specifically.

BRIEF DESCRIPTION OF THE DRAWINGS

Figure 1:
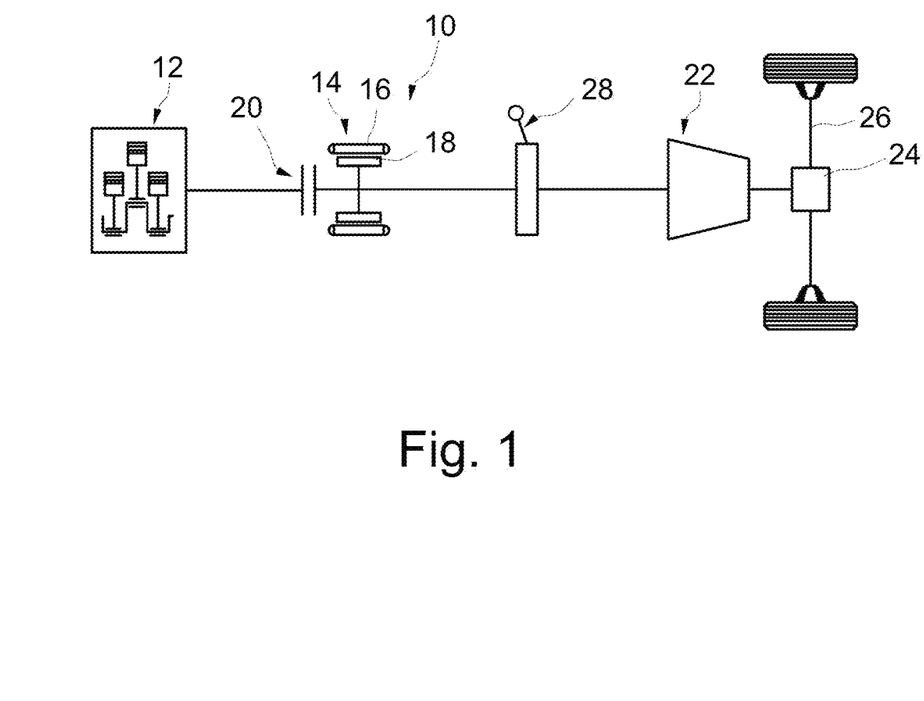
FIG. 1: shows a drive train with a torque transmitting device in a specific embodiment of the disclosure.

FIG. 1 shows a drive train having a torque transmitting device 10 in a specific embodiment of the disclosure. The torque transmitting device 10 is arranged in a drive train of a motor vehicle to transmit a drive torque. The drive torque is provided by a drive element 12, in particular by an internal combustion engine. The torque transmitting device 10 has an electric motor 14 with a stator 16 and a rotor 18 which can be rotated relative to this stator in order to provide a further drive torque. The drive train is a hybrid drive train and the electric motor 14 is incorporated in a P2 configuration. A separating clutch 20 is arranged operatively between the drive element 12 and the electric motor 14, via which the drive element 12 can be decoupled from or connected to the electric motor 14.

The torque transmitting device 10 enables the drive torque to be transmitted to an output element 22, for example a transmission, which is connected to a vehicle axle 26 of the vehicle via a differential gear 24. A centrifugal pendulum 28 is arranged operatively between the separating clutch 20 and the output element 22. The centrifugal pendulum 28 causes a cancellation of the torsional vibrations triggered by the drive element 12, which are characterized in particular by a main excitation order. The centrifugal pendulum 28 is designed for this main order of excitation and thus enables a reduction in the torsional vibrations of the drive element 12.

The arrangement of the centrifugal pendulum 28 between the separating clutch 20 and the driven element 22 makes it possible to reduce the torsional vibrations of the drive element 12 and also the vibrations that occur in the case of exclusively electric driving. A centrifugal pendulum that may be arranged in front of the separating clutch 20 can be omitted.

Figure 2:
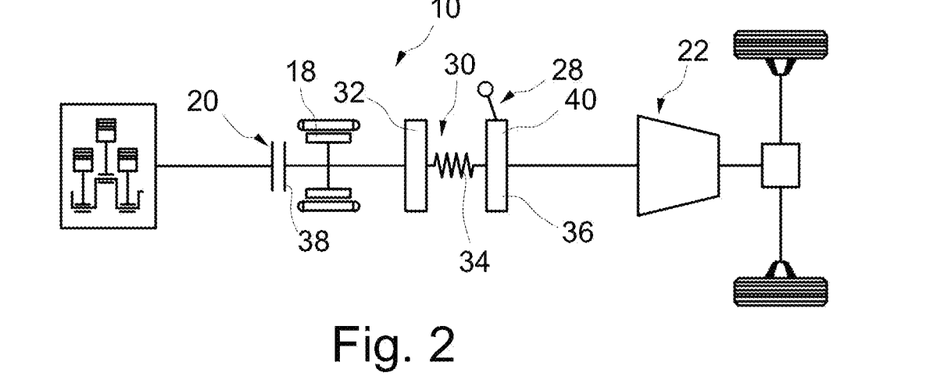
FIGS. 2 to 7: each show a drive train of a torque transmitting device in a further specific embodiment of the disclosure.
Figure 3:
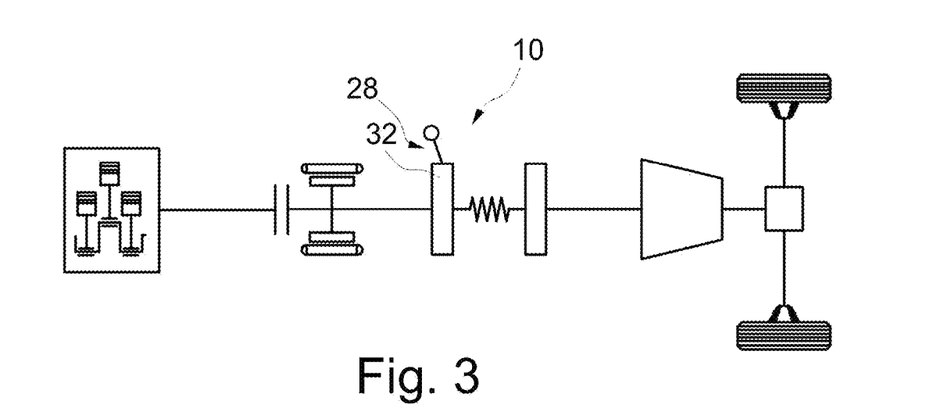
Figure 4:
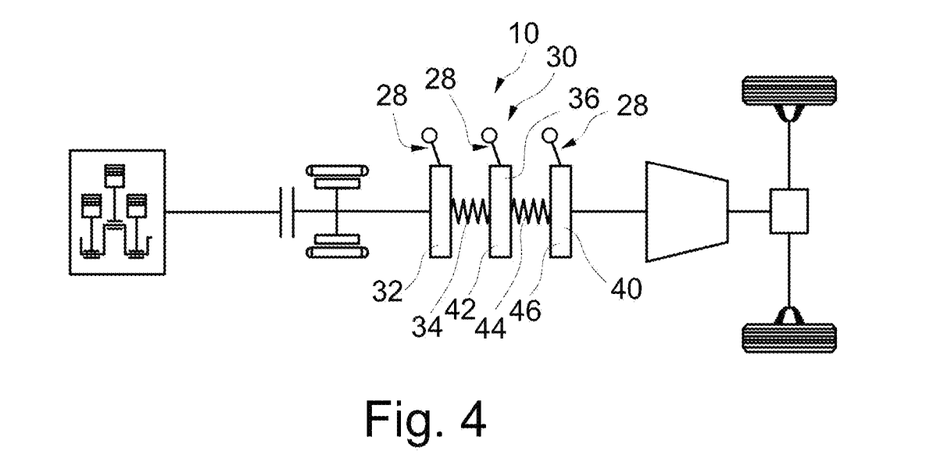

FIGS. 2 to 4 each show a drive train having a torque transmitting device 10 in a further specific embodiment of the disclosure. In FIG. 2, a torsional vibration damper 30 with a damper input part 32 and a damper part 36 that can be twisted to a limited extent in relation to this via the action of spring elements 34 is arranged between the separating clutch 20 and the output element 22. The damper input part 32 is non-rotatably connected to the rotor 18 and a clutch output 38 of the separating clutch 20. The damper part 36 forms a damper output part 40 and is connected to the output element 22. The centrifugal pendulum 28 is preferably arranged on the damper output part 40.

In contrast to this, the centrifugal pendulum 28 is arranged on the damper input part 32 in FIG. 3. In FIG. 4, the torsional vibration damper 30 is designed in several stages and has a further damper part 46 which can be rotated to a limited extent with the damper part 36, which acts as an intermediate damper part 42, via the action of further spring elements 44 which are arranged in series with the spring elements 34. The additional damper part 46 is a damper output part 40. A centrifugal pendulum 28 is arranged on the damper input part 32, a second centrifugal pendulum 28 is arranged on the damper intermediate part 42 and a third centrifugal pendulum 28 is arranged on the damper output part 40. The centrifugal pendulum 28 can all be designed for the same or also for at least two different main excitation orders.

Figure 5:
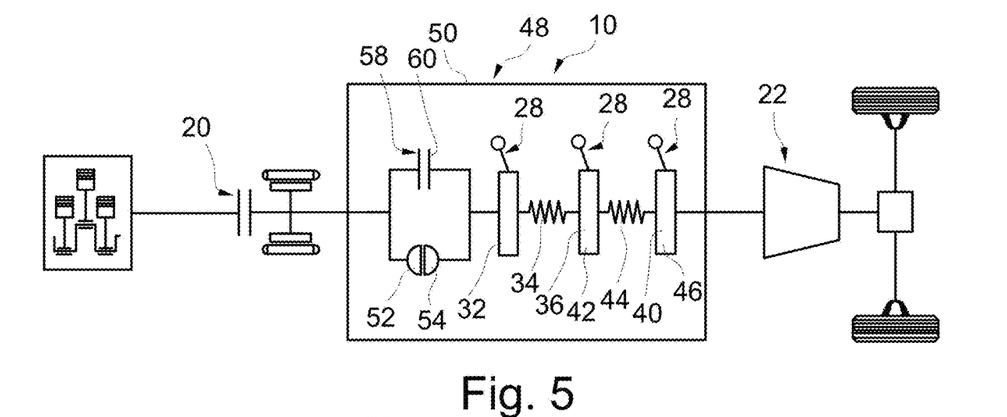
Figure 6:
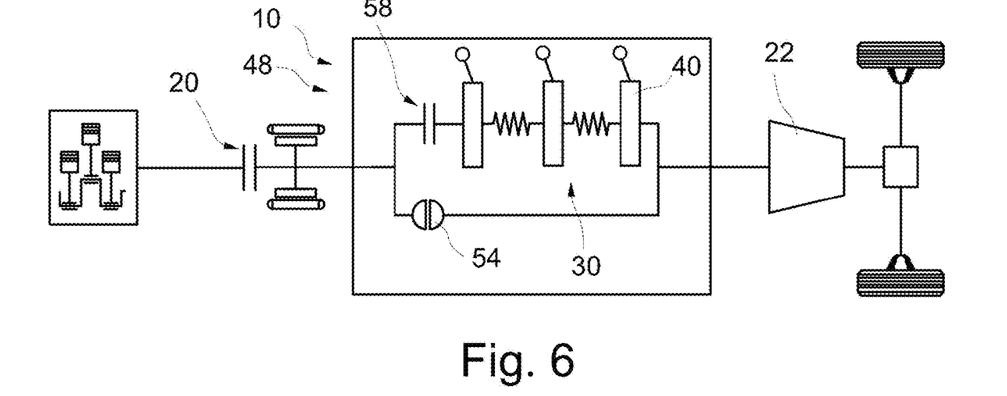
Figure 7:
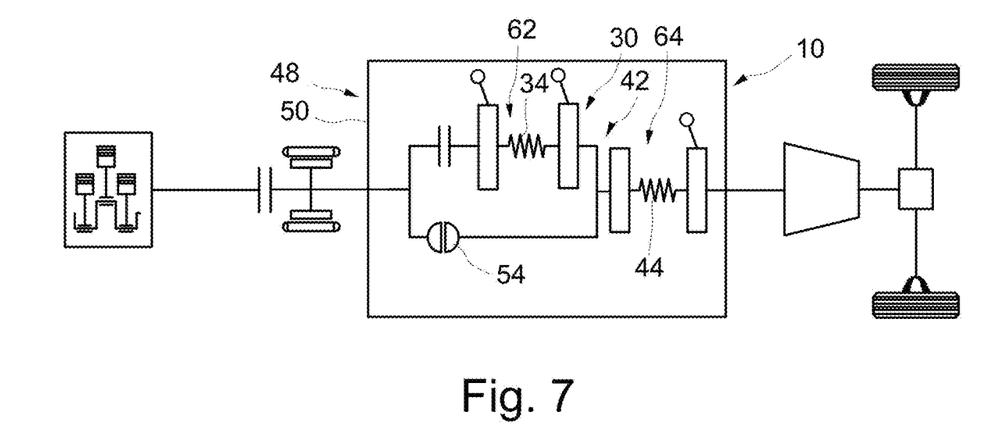

FIGS. 5 to 7 each show a drive train having a torque transmitting device 10 in a specific embodiment of the disclosure. A torque transmitting unit 48 is arranged between the separating clutch 20 and the output element 22. The torque transmitting unit 48 is designed here as a torque converter 50, which has an impeller 52 and a turbine wheel 54 that can be driven by this. A converter bridging clutch 58 is arranged parallel to the pump impeller 52 and the turbine wheel 54. When the converter bridging clutch 58 is closed, torque is transmitted between the separating clutch 20 and the output element 22 via the converter bridging clutch 58. When the torque converter bridging clutch 58 is disengaged, on the other hand, torque is transmitted via the pump impeller 52 and the turbine wheel 54.

A multi-stage torsional vibration damper 30 is connected downstream of the converter bridging clutch 58 and the turbine wheel 54. The torsional vibration damper 30 has a damper input part 32 which is non-rotatably connected to a clutch output 60 of the converter bridging clutch 58 and to the turbine wheel 54. A damper part 36, here an intermediate damper part 42, can be twisted to a limited extent relative to the damper input part 32 by the action of spring elements 34. Another damper part 46, here a damper output part 40, can be rotated to a limited extent relative to the damper intermediate part 42 by the action of further spring elements 44.

A centrifugal pendulum 28 is arranged on the damper input part 32, a second centrifugal pendulum 28 is arranged on the damper intermediate part 42 and a third centrifugal pendulum 28 is arranged on the damper output part 40. The centrifugal pendulum 28 can be designed for the same main order of excitation or for different main orders of excitation.

In FIG. 6, the multi-stage torsional vibration damper 30 arranged between the separating clutch 20 and the output element 22 within the torque transmitting unit 48 is connected downstream of the converter bridging clutch 58. The turbine wheel 54 is non-rotatably connected to the damper output part 40.

The turbine wheel 54 of the torque transmitting unit 48 designed as a torque converter 50 is connected in FIG. 7 to the multipart or one-piece damper intermediate part 42 of the torsional vibration damper 30 and is thereby effective between the first damper stage 62 formed by the spring elements 34 and the second damper stage 64 formed by the further spring elements 44.

Figure 8:
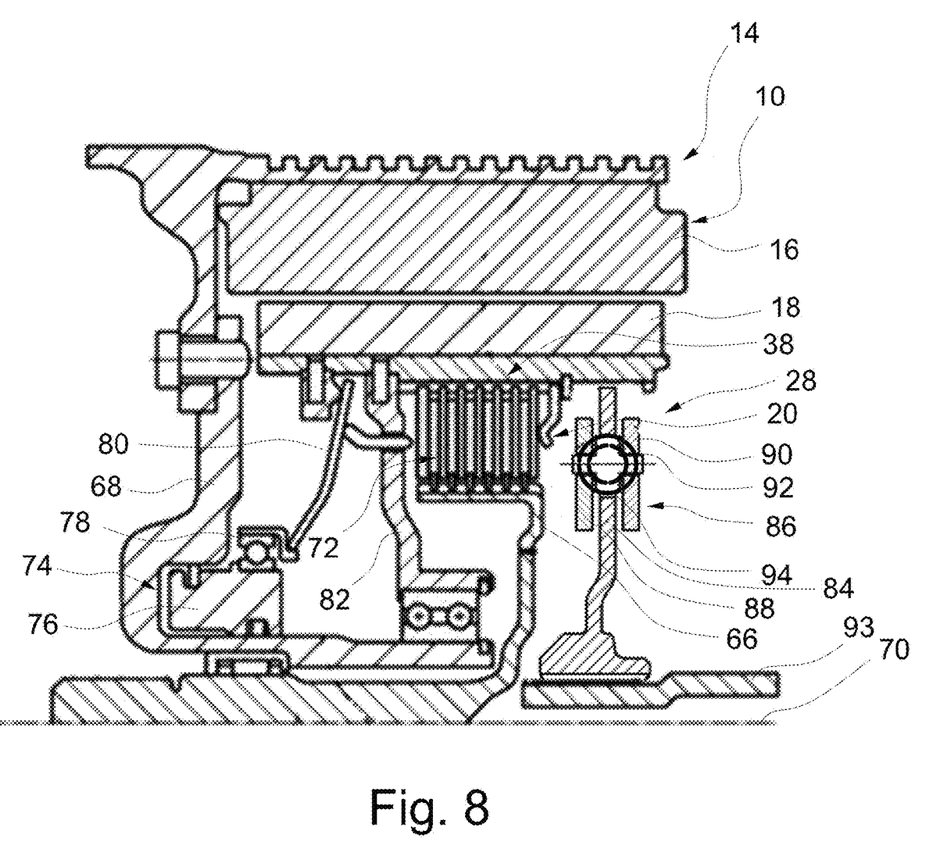
FIG. 8: shows a half section through a torque transmitting device in a further specific embodiment of the disclosure.

FIG. 8 shows a half section through a torque transmitting device 10 in a further specific embodiment of the disclosure. A clutch input 66, which is connected to the drive element 12, of the separating clutch 20 is passed through radially inside a stator carrier 68. The stator carrier 68 is firmly connected to the stator 16 of the electric motor 14. The rotor 18 is arranged to be rotatable about an axis of rotation 70 radially inside the stator 16. The rotor 18 is non-rotatably connected to the clutch output 38 of the separating clutch 20 or is designed in one piece.

The separating clutch 20 comprises multiple friction plates 72 which, when the separating clutch 20 is closed, enable torque to be transmitted between the clutch input 66 and the clutch output 38. The actuation of the separating clutch 20 takes place via an actuating device 74 which comprises an axially displaceable actuating piston 76 which causes a leveraged actuation of the separating clutch 20 via an actuating bearing 78 and a cup spring 80.

The rotor 18 is mounted on the stator carrier 68 via a rotor carrier 82. The rotor 18 is non-rotatably connected to a pendulum mass carrier 84 of the centrifugal pendulum 28. The centrifugal pendulum 28 is arranged operatively between the separating clutch 20 and a driven element. On the pendulum mass carrier 84, pendulum masses 86 that can be deflected to a limited extent along a pendulum track are arranged opposite this. The pendulum masses 86 are each composed of a first pendulum mass part 88 arranged axially on one side of the pendulum mass carrier 84 and a second pendulum mass part 90 arranged on the opposite side of the pendulum mass carrier 84. The first and second pendulum mass part 88, 90 are firmly connected to each other. The pendulum mass carrier 84 is non-rotatably connected to an output shaft 93 for torque transmitting to the output element.

At least two pendulum masses 86 are arranged adjacent to one another on the periphery of the pendulum mass carrier 84. The pendulum masses 86 are coupled to one another via coupling means 92. As a result, noise from the centrifugal pendulum 28 can be reduced. Dropping of the pendulum masses 86 can preferably be dampened or even prevented. In the case of exclusively electric driving, in which the electric motor 14 provides the drive torque and the drive element is switched off, the drive train can be operated more quietly. The arrangement of the centrifugal pendulum 28 between the separating clutch 20 and the driven element causes the centrifugal pendulum 28 to experience both the drive torque and the drive speed of the drive element and the drive torque and the drive speeds of the electric motor 14. The centrifugal pendulum 28 is more efficient and reliable via the coupling means 92.

The coupling means 92 can limit or prevent the pendulum masses 86 from dropping, in particular at low speeds. The coupling means 92 here comprise spring means 94, in particular helical springs, which set a force coupling between the pendulum masses 86 lying next to one another on the peripheral side. The helical springs may comprise a compression spring and/or an arc spring.

Figure 9A:
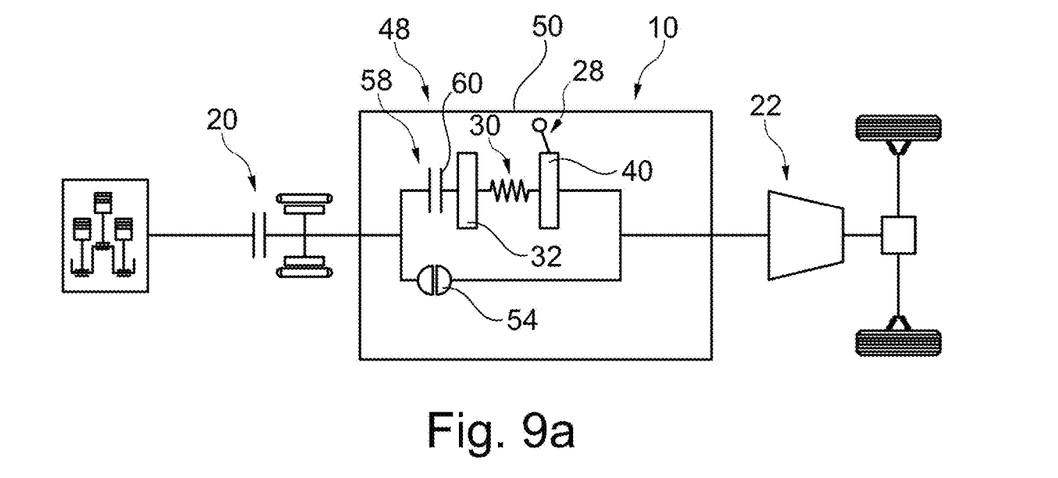
FIG. 9a: shows a drive train with a torque transmitting device in a further specific embodiment of the disclosure.

FIG. 9a shows a drive train having a torque transmitting device 10 in a further specific embodiment of the disclosure. The torque transmitting unit 48 designed as a torque converter 50 is arranged between the separating clutch 20 and the output element 22. The torsional vibration damper 30 is connected downstream of a converter bridging clutch 58 and is designed in one stage. The damper input part 32 of the torsional vibration damper 30 is non-rotatably connected to the clutch output 60 of the converter bridging clutch 58. The damper output part 40 of the torsional vibration damper 30 is non-rotatably connected to the turbine wheel 54. The centrifugal pendulum 28 is arranged on the damper output part 40. The mass moment of inertia of the damper input part 32 is preferably lower than the mass moment of inertia of the damper output part 40.

Figure 9B:
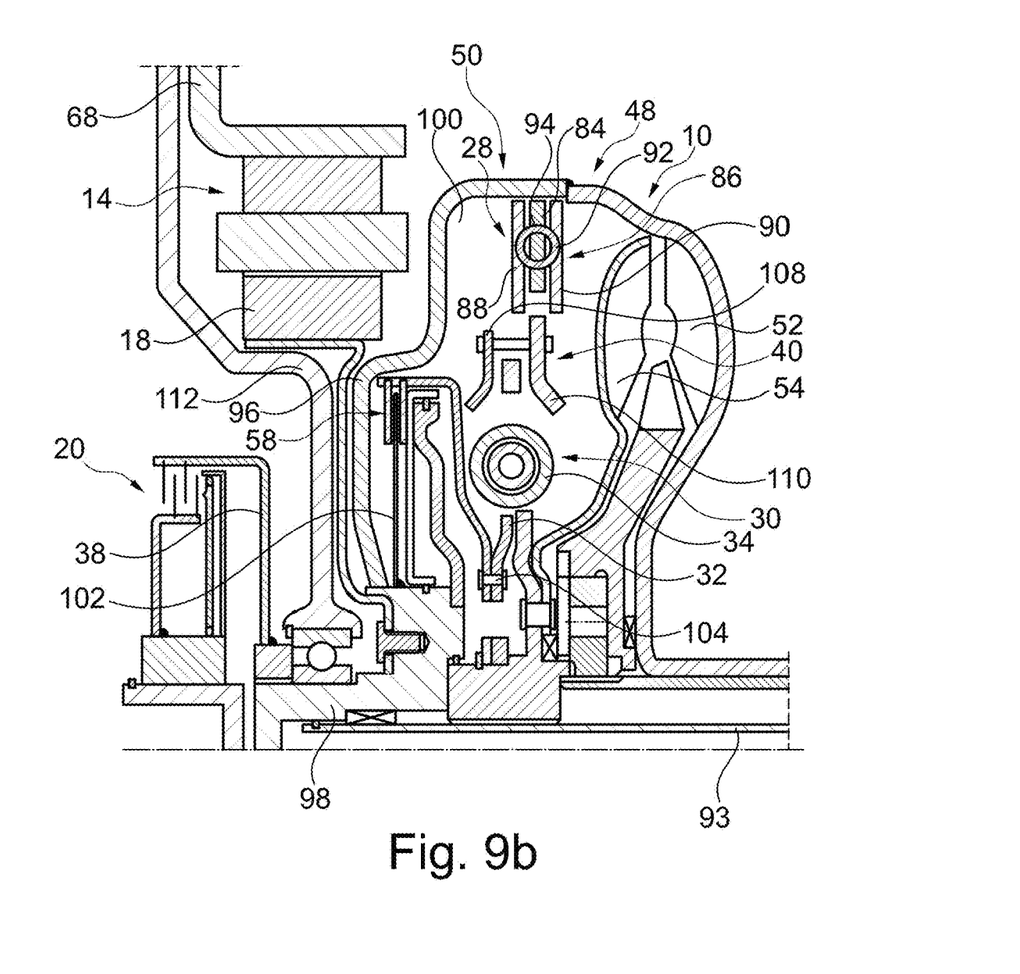
FIG. 9b: shows a half section through a torque transmitting device in a further specific embodiment of the disclosure.

FIG. 9b shows a half section through a torque transmitting device 10 corresponding to the torque transmitting device shown in FIG. 9a in a further specific embodiment of the disclosure. The torque transmitting unit 48 is arranged between the separating clutch 20 and an output element. The clutch output 38 of the separating clutch 20 is connected in a torque-proof manner to the torque transmitting unit 48, here to a converter housing 96 of the torque converter 50, via a drive shaft 98. The converter housing 96 encloses a fluid chamber 100 in which a converter fluid is contained. The converter housing 96 is fixedly connected to the impeller 52 which can cause torque transmitting to the turbine wheel 54 arranged inside the converter housing 96. The converter housing 96 is non-rotatably connected to a clutch input 102 of the converter bridging clutch 58. The clutch output 60 of the converter bridging clutch 58 is non-rotatably connected to the damper input part 32 of the torsional vibration damper 30 via a rivet connection 104. The damper output part 40 can be rotated to a limited extent with respect to the damper input part 32 via the action of spring elements 34. The damper output part 40 is riveted to the turbine wheel 54 and can be connected to the output element via an output shaft 93. The damper output part 40 is designed in two parts and has a first damper disk part 108 and a second damper disk part 110 arranged at an axial distance therefrom.

The centrifugal pendulum 28 is arranged on the second damper disk part 110. The pendulum mass carrier 84 can be designed in one piece with the second damper disk part 110 or can be attached to it as a separate component. The pendulum masses 86 of the centrifugal pendulum 28 are arranged radially outside of the spring elements 34 and radially overlapping the rotor 18 of the electric motor 14 arranged outside of the converter housing 96.

The centrifugal pendulum 28 comprises multiple pendulum masses 86 distributed around the periphery, each of which is made up of the first pendulum mass part 88 and the second pendulum mass part 90 arranged at an axial distance therefrom. The pendulum mass carrier 84 is arranged axially between the first and second pendulum mass parts 88, 90. At least two peripherally adjacent pendulum masses 86 are elastically coupled to one another via coupling means 92, here by spring means 94.

The rotor 18 of the electric motor 14 is connected to the drive shaft 98 in a non-rotatable manner. The electric motor 14 is arranged axially between a housing wall 112 and the converter housing 96. The housing wall 112 enables the torque transmitting unit 48 to be mounted on a fixed housing. In particular, the housing wall 112 is non-rotatably connected to the stator carrier 68.

Figure 10:
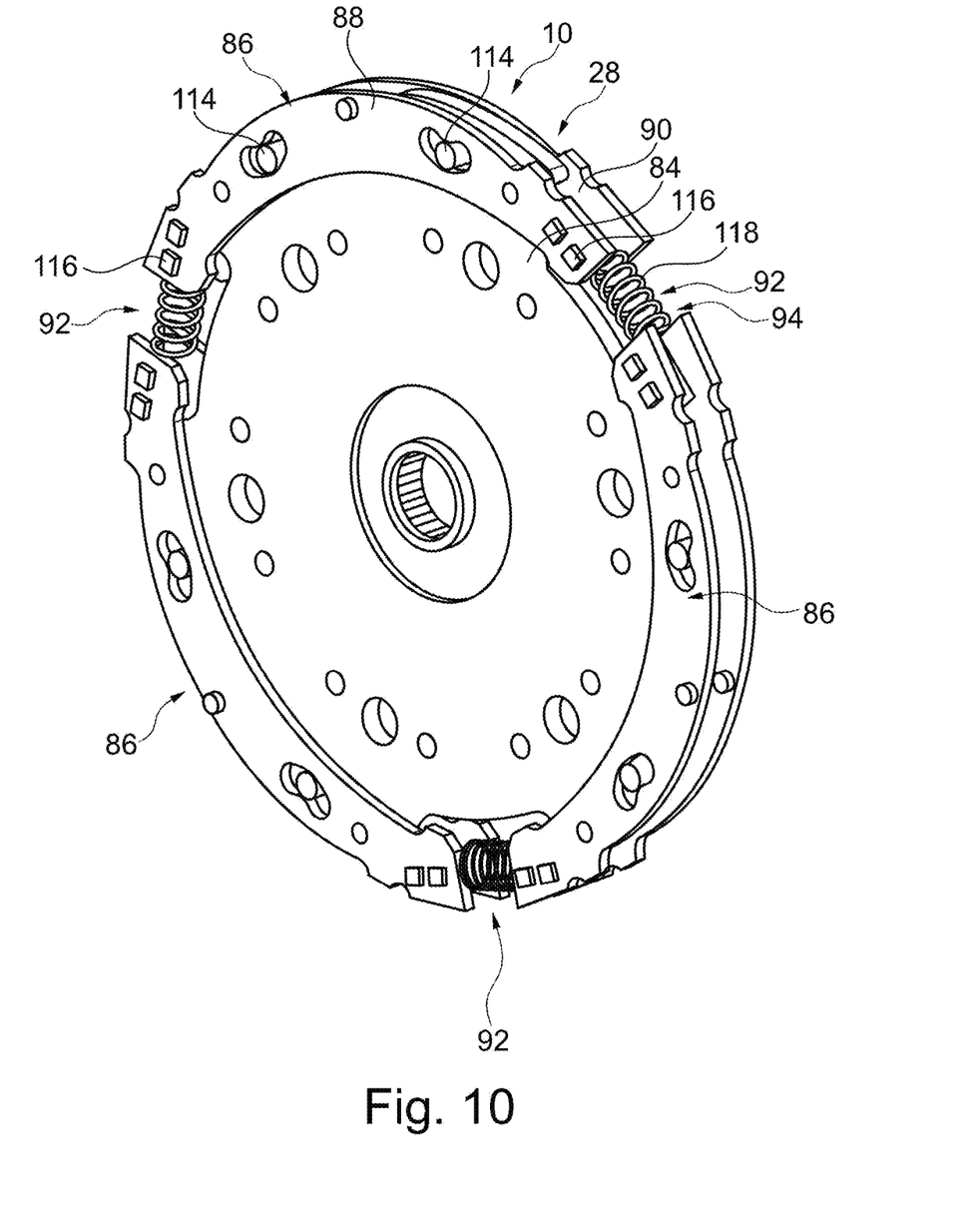
FIG. 10: shows a three-dimensional view of a torsional vibration damper in a further specific embodiment of the disclosure.

FIG. 10 shows a three-dimensional view of a cross-section of a torque transmitting device 10 in a further specific embodiment of the disclosure. The torque transmitting device 10 comprises a centrifugal pendulum 28, which has three peripherally adjacent pendulum masses 86, which are accommodated on the pendulum mass carrier 84 in each case along a pendulum track so that they can be deflected to a limited extent. Each of the pendulum masses 86 has two bearing elements 114 which enable the pendulum masses 86 to move along the pendulum track relative to the pendulum mass carrier 84.

Each pendulum mass 86 is formed by a first pendulum mass part 88 which is arranged on a first axial side of the pendulum mass carrier 84 and a second pendulum mass part 90 which is arranged on an opposite axial side of the pendulum mass carrier 84. The first and second pendulum mass part 88, 90 are firmly connected to each other via spacer bolts 116.

A total of three coupling means 92, which are designed as spring means 94, are arranged on the periphery between the pendulum masses 86. The spring means 94 comprise coil springs 118, here compression springs, via which an elastic coupling between the pendulum masses 86 is made possible.

Figure 11:
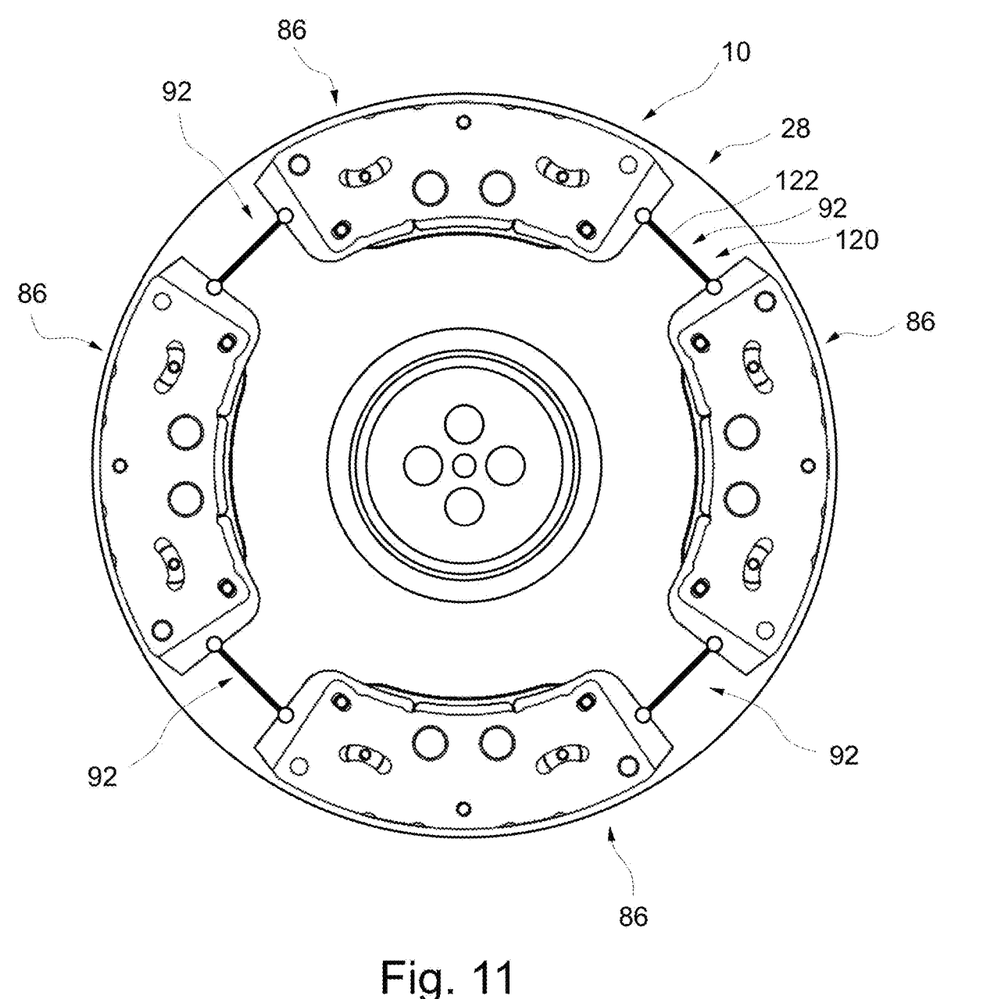
FIG. 11: shows a side view of a torque transmitting device in a further specific embodiment of the disclosure.

FIG. 11 shows a side view of a torque transmitting device 10 in a further specific embodiment of the disclosure. The torque transmitting device 10 has a centrifugal pendulum 28 with four peripherally adjacent pendulum masses 86. The pendulum masses 86 are coupled to one another on the periphery via coupling means 92. The coupling means 92 comprise transmitting means 120 which, as connecting elements 122, set a movement coupling for synchronizing the movement between the pendulum masses 86. The transmitting means 120 are rigid connecting elements 122 which are rotatably mounted on each pendulum mass 86.

Figure 12:
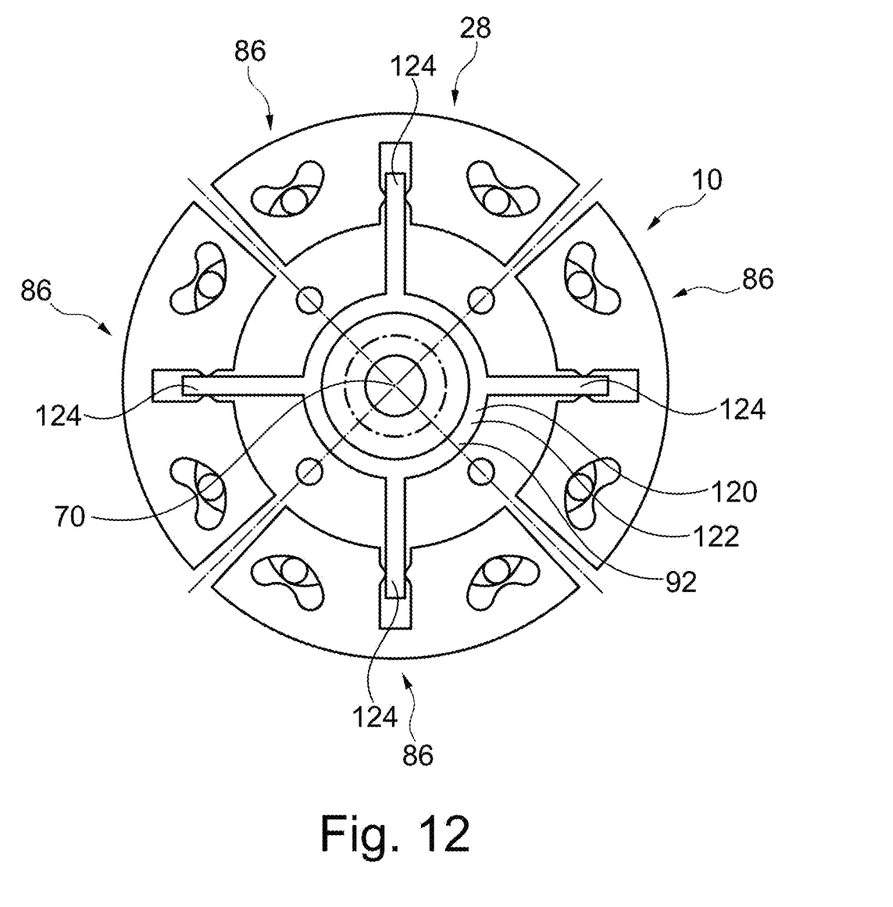
FIG. 12: shows a side view of a torque transmitting device in a further specific embodiment of the disclosure.

FIG. 12 shows a side view of a torque transmitting device 10 in a further specific embodiment of the disclosure. The torque transmitting device 10 comprises a centrifugal pendulum 28 which has four peripherally adjacent pendulum masses 86. The pendulum masses 86 are coupled to one another via a coupling means 92 designed as a transmitting means 120. The transmitting means 120 comprise a one-piece connecting element 122 which is arranged coaxially with respect to the axis of rotation 70 and has connecting sections 124 which are aligned with each pendulum mass 86. The connecting sections 124 each engage in the pendulum masses 86 and bring about a movement coupling between the pendulum masses 86.

LIST OF REFERENCE SYMBOLS

10 Torque transmitting device
12 Drive element
14 Electric motor
16 Stator
18 Rotor
20 Separating clutch
22 Output element
24 Differential gear
26 Vehicle axle
28 Centrifugal force pendulum
30 Torsional vibration damper
32 Damper input part
34 Spring element
36 Damper part
38 Clutch output
40 Damper output part
42 Intermediate damper part
44 Spring element
46 Damper part
48 Torque transmitting unit
50 Torque converter
52 Pump impeller
54 Turbine wheel
58 Converter bridging clutch
60 Clutch output
62 Damper stage
64 Damper stage
66 Clutch input
68 Stator carrier
70 Axis of rotation
72 Friction plate
74 Actuating device
76 Actuating piston
78 Actuating bearing
80 Plate spring
82 Rotor carrier
84 Pendulum mass carrier
86 Pendulum mass 88 Pendulum mass part
90 Pendulum mass part
92 Coupling means
93 Output shaft
94 Spring means
96 Converter housing
98 Drive shaft
100 Fluid space
102 Clutch input
104 Rivet connection
108 Damper disc part
110 Damper disc part
112 Housing wall
114 Bearing element
116 Spacer bolt
118 Coil spring
120 Transmitting means
122 Connecting element
124 Connection section

The invention claimed is:

1. A torque transmitting device for a drive train for transmitting a drive torque provided by at least one drive element to an output element, the torque transmitting device comprising:
    an electric motor having a stator and a rotor which can be rotated relative to said stator for providing a further drive torque,
    a separating clutch arranged operatively between the drive element and the electric motor, and
    at least one centrifugal pendulum arranged operatively between the separating clutch and the output element and having at least two pendulum masses received circumferentially adjacent to one another on at least one pendulum mass carrier rotatable about an axis of rotation and deflectable to a limited extent along a pendulum path,
    wherein:
        peripherally adjacent pendulum masses are coupled to one another via coupling means;
        a torque transmitting unit is arranged operatively between the separating clutch and the output element;
        the centrifugal pendulum is assigned to the torque transmitting unit; and
        the torque transmitting unit is a torque converter with a pump impeller, a turbine wheel, and a converter bridging clutch.

2. The torque transmitting device according to claim 1, wherein the coupling means are configured to set a force coupling and/or a movement coupling between the pendulum masses, wherein the coupling means for the force coupling have spring means and/or the coupling means for the movement coupling have transmitting means for transmitting the movement of one of the pendulum masses to at least the other pendulum mass.

3. The torque transmitting device according to claim 1, wherein the coupling means are arranged peripherally between the pendulum masses.

4. The torque transmitting device according to claim 1, wherein each of the pendulum masses, when moving along the pendulum path, rotates of its own accord about a center of rotation that deviates from the axis of rotation.

5. The torque transmitting device according to claim 1, further comprising: a torsional vibration damper having a rotatable damper input part and a damper part which can be rotated to a limited extent relative thereto via an action of first spring elements arranged operatively between the separating clutch and the output element.

6. The torque transmitting device according to claim 5, wherein the torsional vibration damper is configured with several stages and the damper part is an intermediate damper part to which a further damper part is connected in a limited rotatable manner via the action of second spring elements which are connected in series with the first spring elements.

7. The torque transmitting device according to claim 6, wherein the centrifugal pendulum is arranged on the damper input part or on the damper part or on the further damper part.

8. The torque transmitting device according to a claim 5, wherein the torsional vibration damper is arranged within the torque transmitting unit.

9. The torque transmitting device according to claim 1, wherein the pendulum masses are arranged at least partially radially overlapping the rotor.

* * * * *